Oct. 30, 1945.    G. E. GUELLICH    2,388,051
MOUNT FOR EYEPIECES
Filed Feb. 11, 1943
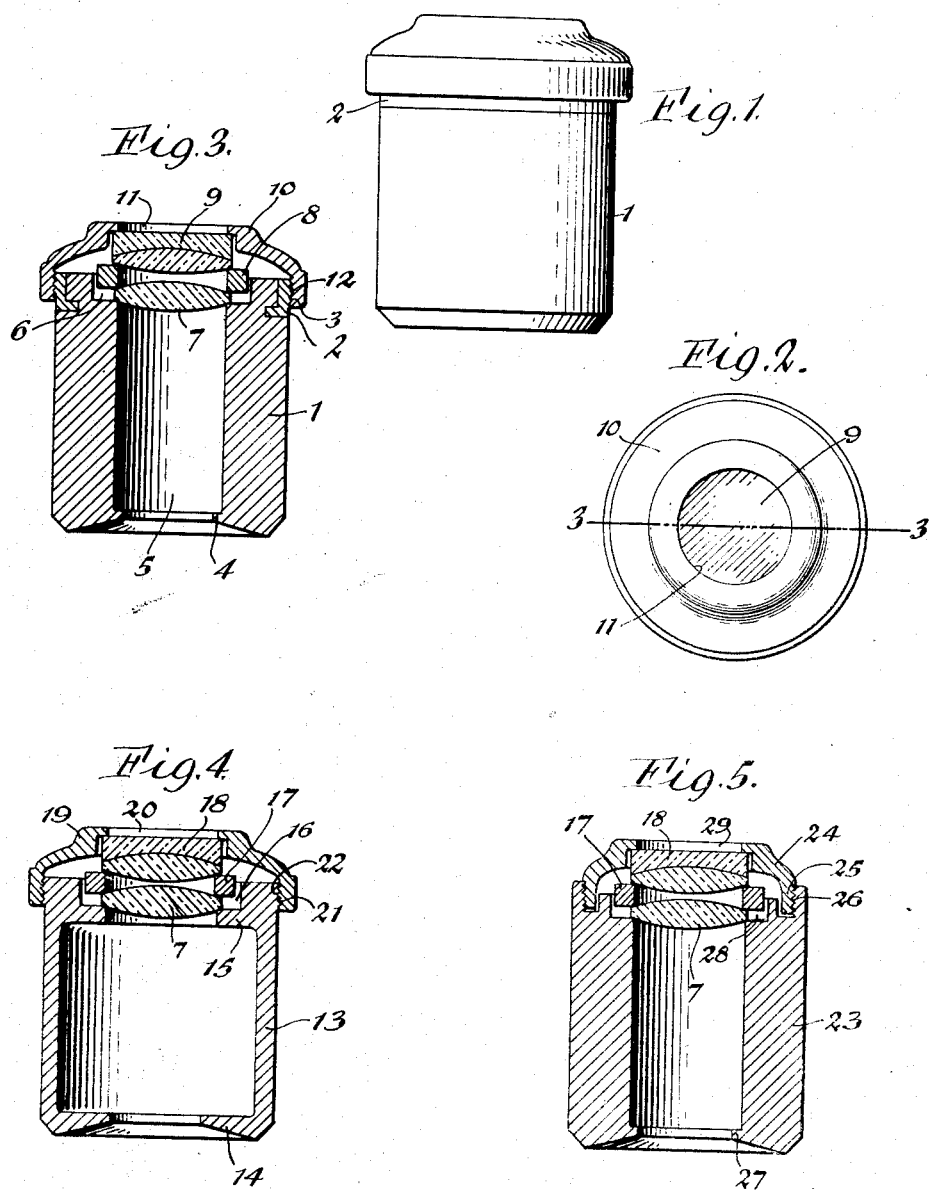
INVENTOR.
GUSTAV E. GUELLICH
BY Raymond A. Paquin
ATTORNEY Patented Oct. 30, 1945

2,388,051

UNITED STATES PATENT OFFICE 2,388,051

MOUNT FOR EYEPIECES

Gustav E. Guellich, Buffalo, N. Y., assignor, by mesne assignments, to American Optical Company, Southbridge, Mass., a voluntary association Application February 11, 1943, Serial No. 475,553

2 Claims. (Cl. 88—57)

This invention relates to improvements in means for mounting lens systems and more particularly to new and improved means for mounting the optical elements of eyepieces and the like.

An object of the invention is to provide a new and improved mount for the optical elements of an eyepiece for microscopes or other optical devices.

Another object of the invention is to provide a new and improved mount for supporting optical elements which is relatively simple and economical to manufacture and efficient in operation.

Another object of the invention is to provide a new and improved mount for a lens system which is easier to assemble and which is of the self-aligning type.

Other objects and advantages of the invention will be apparent from the following description taken in connection with the accompanying drawing. It will be apparent that many changes may be made in the details of construction and arrangement of parts without departing from the spirit of the invention as expressed in the accompanying claims. I, therefore, do not wish to be limited to the exact details of construction and arrangement of parts shown and described as the preferred forms have been shown by way of illustration only.

Referring to the drawing:

Fig. 1 is a side view of an eyepiece embodying the invention;

Fig. 2 is a top or plan view thereof;

Fig. 3 is a sectional view taken along line 3—3 of Fig. 2;

Fig. 4 is a view similar to Fig. 3 but showing a further form of the invention; and Fig. 5 is a view similar to Figs. 3 and 4 but showing a still further modified form of the invention.

Referring more particularly to the present drawing wherein similar reference characters designate corresponding parts throughout the several views the invention has been shown applied to an eyepiece particularly adapted for use in a microscope or the like, although this invention may be applied to other means for supporting the optical elements of a lens system adapted for other optical devices.

In the form of the invention shown in Fig. 3 the tubular body portion 1 of the mount may be formed of Bakelite or other suitable materials such as synthetic resin of the various types now commercially available and in the molding of said tubular portion 1 the metal insert 2 having the threaded outer portion 3 may be simultaneously molded in desired relation in said body portion 1 and also the diaphragm portion 4 may be formed integral therewith. It is pointed out that said insert 2 may be secured to said body 1 by means of screws or other suitable devices and also that said diaphragm portion 4 may be formed separately and secured to said body portion 1 by any suitable means.

The tubular body 1 is provided with the central aperture 5 and adjacent one end of said aperture 5 in said tubular member 1 is formed the groove or recess 6 adapted to form a seat for a lens element 7 and over the surface of said lens element 7 and adjacent the edge thereof is placed a spacing ring 8 which ring supports the lens member 9 and said lens members 7 and 9 and spacing ring 8 are retained in said position by means of the cap member 10 which has a central aperture 11 adapted to be aligned with the lens members 7 and 9 to allow viewing therethrough and said cap member 10 also has the threaded portion adapted to engage the threaded portion 3 on the member 2 to retain said cap in position on said body 1 and to retain said lens members 7 and 9 and spacing ring 8 in position as described above.

It will be seen from Fig. 1 that the retaining ring 8 is a free floating member and rests only upon the outer edges of the lens member 9 and that because of the construction of the mount which is of the self-centering type said lens members are automatically centered upon the assembling of the elements as described above.

In the form of the invention shown in Fig. 4 there is provided a body portion 13 which may be formed of metal or the like and which is provided with the diaphragm portion 14 which may be formed integral with the portion 13 or formed separately and secured thereto.

The body portion 13 is provided with the flange portion 15 adapted to form a seat or support for the lens element 7 which has its outer portion seated in the annular groove or slot 16 in the upper space of said flange portion 15 and surrounding the central aperture in said flange portion 15. In this form of the invention the spacing ring 17 is positioned over the outer portions of the upper surface of the lens member 7 and over said spacing ring 17 is positioned the lens member 18 and said members are retained in said position by means of the cap member 19 having the central aperture 20 and the threaded portion 21 adapted to engage the threaded portion 22 adjacent the upper edge of the body 13 to retain said cap 19 on said body 13 and thereby retain said parts in aligned relation.

In the form of the invention shown in Fig. 5 the body 23 may be formed of metal as described in connection with the form shown in Fig. 4 or may be formed of a plastic or a synthetic resin with or without metal inserts as described in conjunction with the form shown in Fig. 3.

This form is generally similar to the forms shown in Fig. 3 except that the cap member 24 is provided with the portion 25 having an external threaded portion and adapted to engage a threaded portion 26 in a slot in the upper surface of the body 23 and the threaded portion 26 may be formed if desired in a metal insert secured to the body 23 if said body 23 is of a plastic or the like.

In this form the diaphragm 27 may be formed integral with the body portion 23 formed separately and secured thereto. The body portion 23 has the seat or groove 28 in the upper surface thereof surrounding the central aperture in said body and adapted to receive the lens element 7 and over said element 7 is positioned the spacing ring 17 as previously described and over said spacing ring 17 is positioned the lens member 18 over which is positioned the cap member 24 having the aperture 29 therein.

It is pointed out that the construction shown and described contains a minimum number of parts thereby considerably simplifying the assembly of lens systems in such mounts and also that because of the construction such mounts are self-aligning making necessary merely the assemblying of the lens elements in said mounts which automatically centers or aligns the same in optical alignment.

This simplification and ease of assembly provides a construction which has many advantages over prior art construction and provides a simple, efficient and economical construction that may be easily and quickly assembled, with the optical elements in centered relation.

From the foregoing it will be seen that I have provided simple, efficient and economical means for obtaining all of the objects and advantages of the invention.

Having described my invention, I claim:

1. In a device of the character described, a body portion having a central aperture, said body portion being formed of a plastic material, said body portion having an integral annular seat adjacent one end thereof and adjacent said central aperture, a lens element on said seat, a spacing member on said lens element adjacent the periphery thereof to support a second lens element in aligned relation with said first lens element, a separate ring member secured to the outer surface of said body portion and a cap member having a portion interengaging said second lens element and a portion engaging with said separate ring to maintain said body portion and cap member in assembled relation.

2. In a device of the character described a tubular body portion, said body portion being formed of a plastic material and a separate metal element secured thereto and having securing means, said body portion having an annular seat adjacent the central aperture thereof, an optical element on said seat in alignment with said aperture, a spacing member on said lens element adjacent the periphery thereof and supporting a second lens element and a cap member having a portion engaging said second lens element adjacent the periphery thereof and also having a portion having securing means to engage the securing means on said separate annular metal member to retain said members in assembled aligned relation.

GUSTAV E. GUELLICH.